(12) United States Patent
Jedema et al.

(10) Patent No.: US 10,101,214 B2
(45) Date of Patent: Oct. 16, 2018

(54) TEMPERATURE MONITORING

(71) Applicant: NXP B.V., Eindhoven (NL)

(72) Inventors: Friso Jedema, Eindhoven (NL); Romano Hoofman, Leuven (BE); Jan Brands, Eindhoven (NL)

(73) Assignee: NXP B.V., Eindhoven (NL)

( * ) Notice: Subject to any disclaimer, the term of this patent is extended or adjusted under 35 U.S.C. 154(b) by 106 days.

(21) Appl. No.: 14/730,608

(22) Filed: Jun. 4, 2015

(65) Prior Publication Data
US 2015/0362376 A1  Dec. 17, 2015

(30) Foreign Application Priority Data

Jun. 16, 2014  (EP) .................................. 14172569

(51) Int. Cl.
*G01K 1/02* (2006.01)
*G01K 11/06* (2006.01)
*G01K 3/04* (2006.01)

(52) U.S. Cl.
CPC ............... *G01K 1/024* (2013.01); *G01K 3/04* (2013.01); *G01K 11/06* (2013.01)

(58) Field of Classification Search
CPC .......... G01K 1/024; G01K 3/04; G01K 11/06; G01K 11/12; G01K 2207/00; G01N 21/78; G01N 31/229; G01N 31/22; G01N 31/222; G01N 2291/0254; G01N 2291/0256
See application file for complete search history.

(56) References Cited

U.S. PATENT DOCUMENTS

| 2002/0026002 A1* | 2/2002 | Tamura | B41M 5/305 |
| | | | 524/323 |
| 2005/0281311 A1 | 12/2005 | Roberts et al. | |
| 2008/0187021 A1* | 8/2008 | Haarer | G01K 3/04 |
| | | | 374/102 |
| 2009/0001336 A1 | 1/2009 | Habib et al. | |
| 2009/0159866 A1* | 6/2009 | Shah | H01L 23/34 |
| | | | 257/2 |

(Continued)

FOREIGN PATENT DOCUMENTS

| CN | 101268347 A | 9/2008 |
| CN | 102314622 A | 1/2012 |

(Continued)

OTHER PUBLICATIONS

Miao, X. S. et al. "Temperature Dependence of Phase-Change Random Access Memory Cell", Japanese Journal of Applied Physics, vol. 45, No. 5A, pp. 3955-3958 (2006).

(Continued)

*Primary Examiner* — Kabir A Timory

(57) ABSTRACT

Aspects of the present disclosure relate to phase-change materials. In accordance with an example embodiment, a phase-change material has a crystalline structure that manifests changes that increase as a function of time. For example, such changes may be implemented for monitoring the time that a perishable item has been exposed to an environment having a temperature that is greater than a threshold temperature. Based on the changes, a characterization is provided, indicative of the exposure of the phase-change material to the environment having the temperature that is greater than the threshold temperature.

18 Claims, 3 Drawing Sheets

(56) References Cited

U.S. PATENT DOCUMENTS

2012/0314276 A1* 12/2012 Nomura ............. C08G 18/3206
359/296

FOREIGN PATENT DOCUMENTS

| DE | 10 2006 011 737 A1 | 9/2007 |
|----|---|---|
| KR | 10-2004-0042122 A | 5/2004 |
| WO | 2007/002161 A2 | 1/2007 |
| WO | 2010/097279 A2 | 9/2010 |

OTHER PUBLICATIONS

Extended European Search Report for Patent Appln. No. 14172569.7 (dated Oct. 6, 2014).
Labuza, T. "Determination of the Shelf Life of Food", 10 pgs, retrieved from the internet at: http://depa.fquim.unam.mx/amyd/archivero/ShelfLife1corto_8507.pdf (1982).
Lankhorst, M. H. R. "Modelling glass transition temperatures of chalcogenide glasses. Applied to phase-change optical recording materials", Journal of Non-Crystalline Solids, 10 pgs (2002).
Jedema, F. et al. "Influence of Surrounding Dielectrics on the Data Retention Time of Doped $Sb_2Te$ Phase Change Material", Japanese Journal of Applied Physics, 3 pgs (2011).
Pieterson, L. van et al. "Phase-change materials with a growth-dominated crystallization mechanism: a materials overview", Journal of Applied Physics, vol. 97, No. 8, 29 pgs, (Apr. 2005).
Vollebregt, M. "Pasteur: Perishable monitoring through smart tracking of lifetime and quality by RFID", $4^{th}$ International Workshop "Cold-Chain-Management", 38 pgs, (2010).

\* cited by examiner

TEMPERATURE MONITORING

CROSS-REFERENCE TO RELATED APPLICATIONS

This application claims the priority under 35 U.S.C. § 119 of European patent application no. 14172569.7, filed on Jun. 16, 2014, the contents of which are incorporated by reference herein.

FIELD

Aspects of various embodiments are directed to monitoring temperature over time, such as monitoring temperature of perishable items.

BACKGROUND

Many applications benefit from temperature monitoring for a variety of purposes. For instance, it is desirable to monitor temperature in the food and pharmaceutical industries for products that are sensitive to temperature exposure. Certain foods or pharmaceuticals can lose useful lifetime when exposed to high temperatures. Other applications, such as electronics applications, may also be susceptible to undesirable temperature-related effects.

Referring particularly to applications involving perishable products, a forward reaction rate exhibits an Arrhenius type of dependency, such that a shelf-life of food, pharmaceutical product or other perishable product is exponentially responsive to temperature. It can be desirable to detect or monitor such exponential decay as an indication of the quality of perishable product being monitored. While various approaches exist to capture exponential decay, such approaches can undesirably require a power source. Further, many applications are difficult to implement with powered circuits. For instance, hazardous environments may not be amenable to power supplies. Many environments are difficult to access, and monitoring may be otherwise expensive to implement with powered (e.g., battery) applications, such as for monitoring individual food or pharmaceutical packages.

These and other matters have presented challenges to temperature monitoring, for a variety of applications.

SUMMARY

Various example embodiments are directed to temperature monitoring, and to related circuits and their implementation.

According to an example embodiment, an apparatus includes a phase-change material having a crystalline structure that manifests changes that increase as a function of time, over which a perishable item has been exposed to an environment having a temperature that is greater than a threshold temperature. A detection circuit responds to the changes by providing a characterization of the exposure of the phase-change material to the environment having the temperature that is greater than the threshold temperature. For instance, where the phase-change material manifests an electrical characteristic such as conductivity that varies according to an amount of crystallization, and where the crystallization is based on temperature and/or a duration of temperature exposure of the phase-change material, one or both of a maximum temperature and a duration to which the phase-change material has been exposed to the maximum temperature can be ascertained.

Another example embodiment is directed to a method in which a phase-change material is provided, having a crystalline structure that manifests changes that increase as a function of time, without necessarily powering the phase change material. The time may, for example, pertain to a time over which a perishable item has been exposed to an environment having a temperature that is greater than a threshold temperature. In a powered mode, a characterization of the exposure of the phase-change material to the environment having the temperature is greater than the threshold temperature is provided. This characterization can be made under powered conditions, based on an electrical characteristic of the phase-change material.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
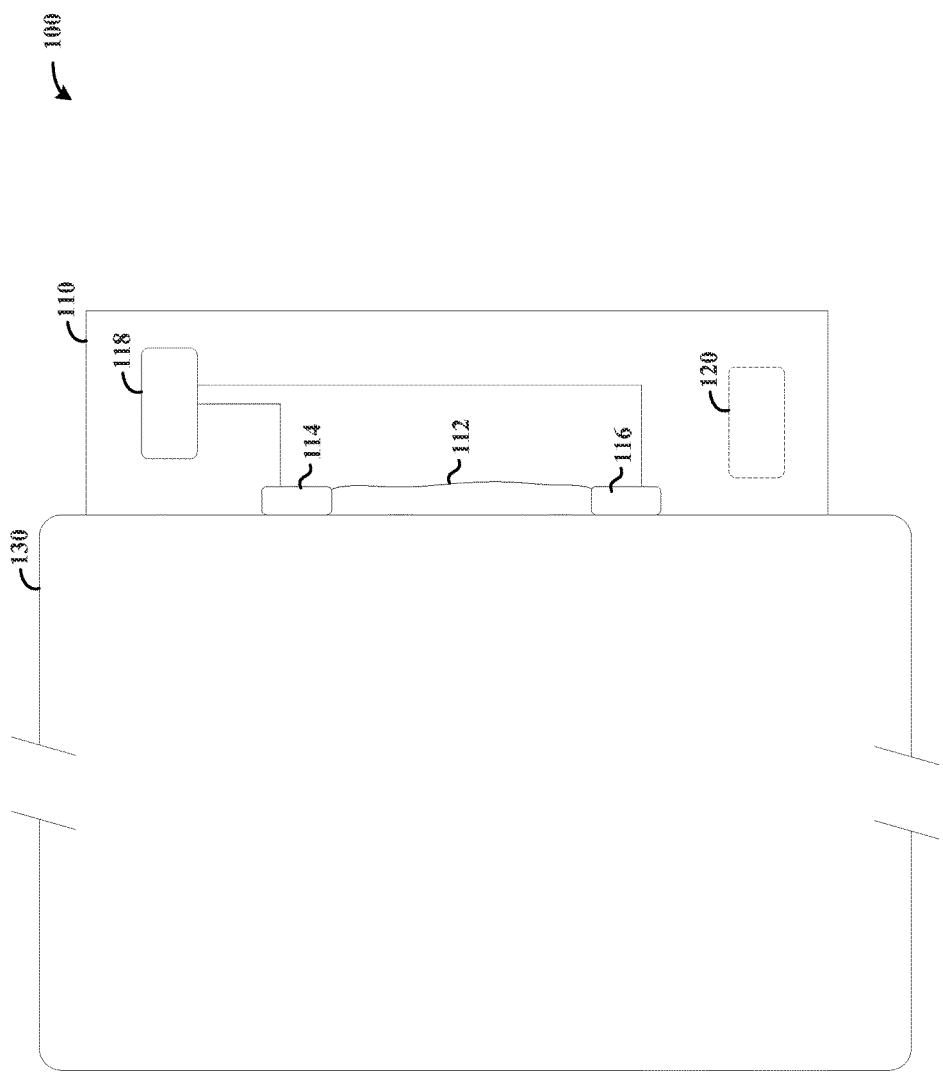
FIG. 1 shows a temperature sensor apparatus, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving temperature sensing, as may be implemented over time and indicative of an exposure of a perishable material to temperature(s) over time. While not necessarily so limited, various aspects may be appreciated through a discussion of examples using this context.

Various example embodiments are directed to monitoring temperature, with specific embodiments directed to temperature monitoring without necessarily implementing a power source, and which may be implemented over time during which an indication of a duration of exposure to temperature can be ascertained. In a particular implementation, a phase-change material is provided with a perishable or other item for which exposure to temperature is desirably monitored or detected. The phase-change material is operable to change crystalline phase in response to temperature conditions, and in some instances to an amount of time to which the phase-change material is exposed to temperature. These changes may be implemented in a powerless environment, such as within food or pharmaceutical packaging (e.g., stored in a warehouse or being shipped). The phase-changes can later be detected via wired or wireless coupling of energy, and detection of electrical characteristics that are indicative of the phase. Accordingly, various embodiments address temperature-related challenges, such as those relating to the food and or pharmaceutical industries, as discussed in the Background section above.

In a specific implementation, a phase-change material is implemented in a temperature sensor apparatus including a phase-change random access memory (PCRAM) cell. The temperature sensor apparatus provides powerless temperature sensing for a variety of applications, such as in the cold chain or other environments in which exposure of a product or other item to certain temperatures or temperature ranges is desirably monitored. Further, these applications do not require power for sensing (e.g., with power applied later during readout). In some implementations, the PCRAM cell operates as a transition point indicator, marking an event indicating that a temperature threshold or thresholds have been reached. In other implementations, the PCRAM cell operates to mark a time period during which a certain temperature threshold has been reached and maintained for a degree of time, based on a degree of phase-change material that has changed in accordance with a rate exhibited by the material. In still other implementations, the PCRAM senses a total temperature-time exposure indicative of a combination of temperature level and time of exposure. Such approaches can be used to provide an indication of accumulated decay within a perishable product such as food or pharmaceuticals.

The temperature indicated via the phase-change material is read or otherwise detected in one or more of a variety of manners. In some implementations, a power supply is connected to the phase-change material via wired connections, and used to read an electrical characteristic thereof. In other implementations, wireless power is provided to the phase-change material, such as by using a radio frequency identification (RFID) type approach in which wireless energy is harvested and used to detect an electrical characteristic of the phase-change material and to provide an output indicative of the detected electrical characteristic. Moreover, such a phase-change material can be reprogrammed and reused (e.g., for more than 100 k cycles), such as by providing a phase-change reversing signal across the phase-change material.

In accordance with various embodiments, an apparatus includes both a phase-change material and a readout-type circuit that operates to read an electrical characteristic of the phase-change material. The phase-change material has a crystalline structure that manifests changes that increase as a function of time over which a perishable item has been exposed to an environment having a temperature that is greater than a threshold temperature. For instance, the phase-change material may exhibit a crystallization rate that increases with increasing temperature. The readout-type circuit responds to the changes by providing a characterization of the exposure of the phase-change material to the environment having the temperature that is greater than the threshold temperature. For instance, electrical power may be harvested from a wireless signal and uses to transmit a wireless signal characterizing exposure of the phase-change material to the environment having the temperature that is greater than the threshold temperature. The characterization may relate to an amount of crystalline structure in the phase change material, relative to an electrical output of the phase-change material in an amorphous state.

In a more particular embodiment, the phase-change material operates in a first state with a crystalline structure that is predominantly in a first phase, corresponding to exposure of the crystalline structure to a first temperature range. The phase-change material also operates in a second state, with a crystalline structure in which at least a portion of the crystalline structure having the first phase in the first state has undergone a phase-change to a second phase. This phase change is based on the material reaching a second temperature range that is higher than the first temperature range. In some implementations, the crystalline structure exhibits a crystallization rate that increases with temperature, and the phase-change material is operative in the second state, in which the portion of the crystalline structure has undergone the phase-change at different crystallization rates corresponding to increases in temperature over time.

The readout-type circuit may be implemented in a variety of manners to suit particular embodiments. In some embodiments, the readout circuit operates with the phase-change material to characterize an amount of time at which the phase-change material has been exposed to a temperature greater than the threshold. Such an approach may be carried out by providing an indication of an amount of the crystalline structure that has changed from a first phase to a second phase. In certain embodiments, the readout-type circuit characterizes (or provides a characterization of) a temperature to which the phase-change material has been exposed, by providing an indication of an amount of the crystalline structure that has changed from a first phase to a second phase.

The crystalline structure may be implemented in a variety of manners. In some embodiments, the crystalline structure manifests the changes by changing from a first phase to a second phase, and subsequently undergoing a change in crystalline structure in the second phase to crystalline structure in the first phase in response to a voltage applied across the terminals. As such, the phase-change material can be reset for detecting exposure of the phase-change material to temperature. In certain embodiments, the phase-change material includes a chalcogenide material in an integrated circuit (IC) including the readout-type circuit as well as an RFID circuit. The RFID circuit harvests electrical power from a wireless signal and uses the harvested electrical power to transmit a wireless signal characterizing exposure of the phase-change material to the environment having the temperature that is greater than the threshold temperature.

In a particular embodiment, the phase-change material includes different portions of phase-change material that exhibit different activation energies and crystallization temperatures. Respective pairs of terminals are connected by the portion of phase-change material for providing an electrical characteristic of the phase-change material. Electrical outputs are provided for each of the phase-change material portions, with the outputs being based on an amount of crystalline structure of the portion having manifested changes responsive to temperature. The output characterizes exposure of the phase-change material to respective temperatures in the second temperature range.

In some implementations, the different portions of phase-change material exhibit different crystallization temperatures, and a readout circuit determines a maximum temperature to which the phase-change material is exposed based upon one of the portions having crystallized and another of the portions having not crystallized. Such an approach may, for example, be useful where the respective portions exhibit increasing crystallization temperature. Where the portions exhibit increasing crystallization temperature, by detecting portions having adjacent crystallization temperature values (relative to the other portions), a relatively narrow temperature range can be identified. The determined maximum temperature can be identified as a temperature in a range between the crystallization temperatures of the first and second portions.

In a more particular implementation, each of the different portions exhibits a transition temperature ($T_G$) above which an amorphous phase of the portion attains structural configurations, and below which the amorphous phase is frozen into a structure that does not readily change structure. Each portion also exhibits a crystallization temperature ($T_C$) at which total crystallization of the portion takes place in less than 10 seconds. Each of the different portions exhibits a $T_G$ and $T_C$ that are different than respective $T_G$ and $T_C$ exhibited by the other portions. In such embodiments, a readout circuit may be employed which determines a maximum temperature exposed to the phase change material as a temperature between $T_C$ of a first one of the portions that exhibits about complete crystallization and $T_C$ of a second one of the portions that exhibits less than complete crystallization. A duration of exposure of the maximum temperature to the phase change material is determined based on an amount of the second portion having crystallized and a crystallization rate of the second portion.

The various embodiments described herein may be implemented for use in a variety of applications. For instance, such embodiments may be implemented with a variety of cold chain type implementations. One such embodiment involves the use of a phase-change material, such as within a PCRAM cell, which is implemented in powerless pharmaceutical and food applications. Another embodiment involves data logging, in which an environment susceptible to exposure to an elevated temperature or elevated temperatures over time can be monitored. In a particular implementation, such an approach involves different phase-change materials that are differently responsive to exposure to various temperature levels (e.g., each material exhibiting a phase-change at different temperature levels), with the resulting phase-change being indicative of temperature behavior over time. These embodiments may be implemented for statistical process control, temperature warnings, detecting upper tolerance limits and upper warning limits, shelf life monitoring, detecting a most significant temperature parameter, detecting Arrhenius law temperature dependence, and with quality models.

In a particular embodiment, a sensor apparatus detects an integrated temperature-time-exposure of Arrhenius-activated decay processes in perishable products, without the need of a continuous power supply. A phase-change circuit is initialized (e.g., programmed), a value is read out at the beginning of a lifetime monitoring period, such as via direct electrical connection or via wireless power and communications, as may be implemented with an RFID circuit and reader. After initialization and a passage of time (e.g., hours, days, or months), the phase-change circuit is read again in a manner as above and characteristics of the phase-change material as manifested in the reading are detected and used as an indication of temperature-related exposure. Such exposure may involve detection of one or more temperature thresholds and/or of a duration over which the sensor has been exposed to a temperature threshold or thresholds.

Another particular embodiment is directed to a PCRAM cell, such as described above, integrated on an integrated circuit (IC) chip such as a silicon IC chip. The PCRAM cell includes a chalcogenide phase-change material. In the amorphous state, the phase-change material exhibits a $T_G$ that represents a temperature above which an amorphous phase can attain various structural configurations and below which the amorphous phase is frozen into a structure which does not readily change structure. For temperatures above $T_G$, the amorphous PCRAM cell starts to crystallize at a crystallization rate that exponentially (Arrhenius law) increases with temperature. At a crystallization temperature $T_C$, the total crystallization takes place in a few seconds, whereas at lower temperatures (e.g., 30° C. lower than $T_c$), crystallization may occur over time (e.g., days or weeks).

Characteristics relating to $T_G$ and $T_C$ can be used to determine a maximum temperature and/or a temperature to which the PCRAM cell has been exposed over time. For example, where a single phase-change material is implemented and having respective $T_G$ and Tc temperatures, detecting that the phase-change material has partially changed can be an indication of a temperature exceeding $T_G$ for at least a period of time, but not reaching $T_C$. As another example, where two or more such cells can be used with different values of $T_G$ and/or $T_C$, exposure to various temperature ranges can be ascertained. For instance, by using multiple cells exhibiting incrementally higher $T_C$, a good estimate can be determined for an actual maximum temperature. To this end, a sensor may be implemented with multiple phase-change materials exhibiting a multitude of different activation energies and crystallization temperatures. Further, by detecting electrical characteristics of partially-changed cells having a $T_C$ higher than the actual maximum temperature and using a known phase-change rate for such a cell at the maximum temperature, a duration of the temperature exposure can be estimated. For general information regarding phase-change materials and different temperature-related characteristics, and for specific information regarding such materials and characteristics as may be implemented in accordance with one or more embodiments, reference may be made to M. H. R. Lankhorst, *Modelling glass transition temperatures of chalcogenide glasses applied to phase-change optical recording materials*, Journal of Non-Crystalline Solids 297 (2002) 210-219; and to F. J. Jedema et al., *Influence of Surrounding Dielectrics on the Data Retention Time of Doped $Sb_2Te$ Phase-change Material*, Japanese Journal of Applied Physics 50 (2011) 024102, both of which are fully incorporated herein by reference.

A variety of types of phase-change materials can be used to suit particular embodiments. For instance, phase-change materials having a $T_C$ of about 60° C. and lower activation energies on the order of 1 eV (or 96 kJ/mol) can be implemented. In various embodiments, In-doped and/or Ga-doped $Sb_2Te$ materials can be implemented as described herein.

In some embodiments, PCRAM resistance in an amorphous state can be represented as:

$$R(t) = R_0 \cdot e^{-\frac{E_A}{kT}} \cdot t, \qquad (1)$$

where R is the resistance in the amorphous state and $E_A$ is the activation energy of the phase-change material. For many perishable products, shelf time can be represented by the following equation:

$$Q(t) = Q_0 \cdot e^{-\frac{E_P}{kT}} \cdot t, \qquad (2)$$

where Q is the remaining quality of the perishable product and $E_P$ is the activation energy of the decay reaction rate. Rewriting Equations 1 and 2 yields:

$$Q(t) = Q_0 \cdot \frac{R(t)}{R_0} e^{\frac{(E_A - E_P)}{kT}} \cdot t \quad (3)$$

Equation 3 shows that the difference between $E_P$ and $E_A$ is relatively small, providing a meaningful result. For instance, in applications having a temperature range of interest from 20° C. to +40° C., a difference of about 0.2 eV can be implemented in this regard.

In a more particular embodiment, a PCRAM sensor captures accumulative temperature-time exposure of a perishable product. The reaction rate activation energy of the PCRAM sensor is set to be less than 0.2 eV different than the activation energy of the perishable product. Such a sensor can be integrated on a RFID tag, and may communicate in the low frequency (LF), high frequency (HF) or ultra-high frequency (UHF) bands.

In certain embodiments, a PCRAM sensor indicates whether an upper temperature limit has been violated, without necessarily exhibiting a discernable transition temperature $T_G$ (e.g., the phase-change material stays generally unchanged until reaching $T_C$). In such an embodiment, the reaction rate activation energies of the perishable product and the PCRAM sensor may not necessarily match within 0.2 eV as discussed above, and the crystallization temperature is set to an imposed upper temperature limit for the product.

The various embodiments described herein may be combined in certain embodiments, and various aspects of individual embodiments may be implemented as separate embodiments. For instance, various aspects described above may be implemented in connection with one or more components shown in FIG. 1. Similarly, aspects of FIG. 1 may be implemented in separate embodiments, such as by implementing phase-change material and readout terminals separately from other circuitry.

Turning now to the Figures, FIG. 1 shows a temperature sensor apparatus 100, in accordance with another example embodiment. The apparatus 100 includes a sensing component 110 having a phase-change material 112 that is susceptible to phase-change in response to temperature. This phase-change may, for example, be implemented in accordance with one or more examples as described above.

The phase-change material 112 is shown coupled to terminals 114 and 116, via which an electrical characteristic of the phase-change material can be detected. A sensor circuit 118 is also shown coupled to the terminals, and is implemented for providing sensing of the electrical characteristic. The sensor circuit 118 may be implemented simply (e.g., as providing an electrical connection to the terminals 114 and 116), or with functionality for ascertaining temperature-related aspects as indicated via the phase-change material 112. For example, various embodiments are directed to on-chip processing of information including the electrical characteristic of the phase-change material, and certain embodiments are directed to off-chip processing of such aspects. As such, the sensor circuit 118 can be implemented in a variety of manners to suit particular applications.

In some embodiments, the apparatus 100 also includes a wireless communication circuit 120, shown by way of example as an RF circuit. Such a circuit may, for example, be implemented using RFID technology. In certain implementations, the wireless communication circuit 120 harvests wireless energy, and provides the wireless energy to the apparatus 100 for use in reading the electrical characteristic of the phase-change material 112 (e.g., by applying a voltage across terminals 114 and 116). Using such an approach, the phase-change material 112 can be accessed wirelessly and via wireless power, such for initialization and/or reading temperature characteristics manifested in changes to the phase-change material.

By way of example, the apparatus 100 is shown coupled to a monitored environment 130. In some embodiments, the apparatus 100 is implemented within the monitored environment 130, such as within food or pharmaceutical packaging. In other embodiments, the monitored environment is integrated with and forms part of the apparatus 100. Such an environment may, for example, include a packaging or storage component.

Figure 2:
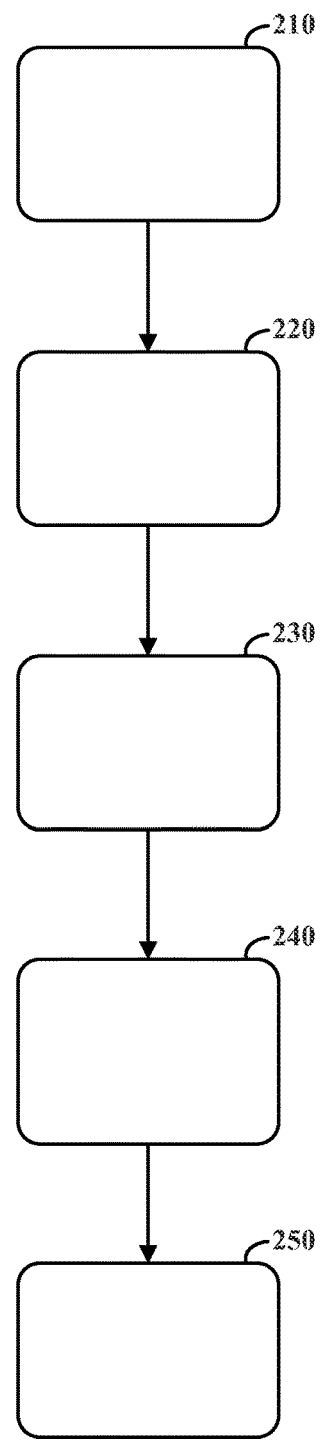
FIG. 2 shows a flow diagram for an approach to monitoring perishable items, in accordance with another example embodiment.

FIG. 2 shows a flow diagram for an approach to monitoring perishable items, in accordance with another example embodiment. At block 210, a phase-change material sensor is initialized by setting the phase thereof. At block 220, the phase-change sensor is implemented with a monitoring application, such as by coupling the sensor to, or placing the sensor within, food or pharmaceutical packaging. Power is provided to the sensor at block 230, and an electrical characteristic of the sensor is detected using the provided power at block 240. The electrical characteristic is processed at block 250, with a model or other information that correlates the electrical characteristic to the phase of the phase-change material (or degree of phases therein). In some implementations, block 250 operates in accordance with Equation 3 above, for estimating temperature exposure.

Figure 3:
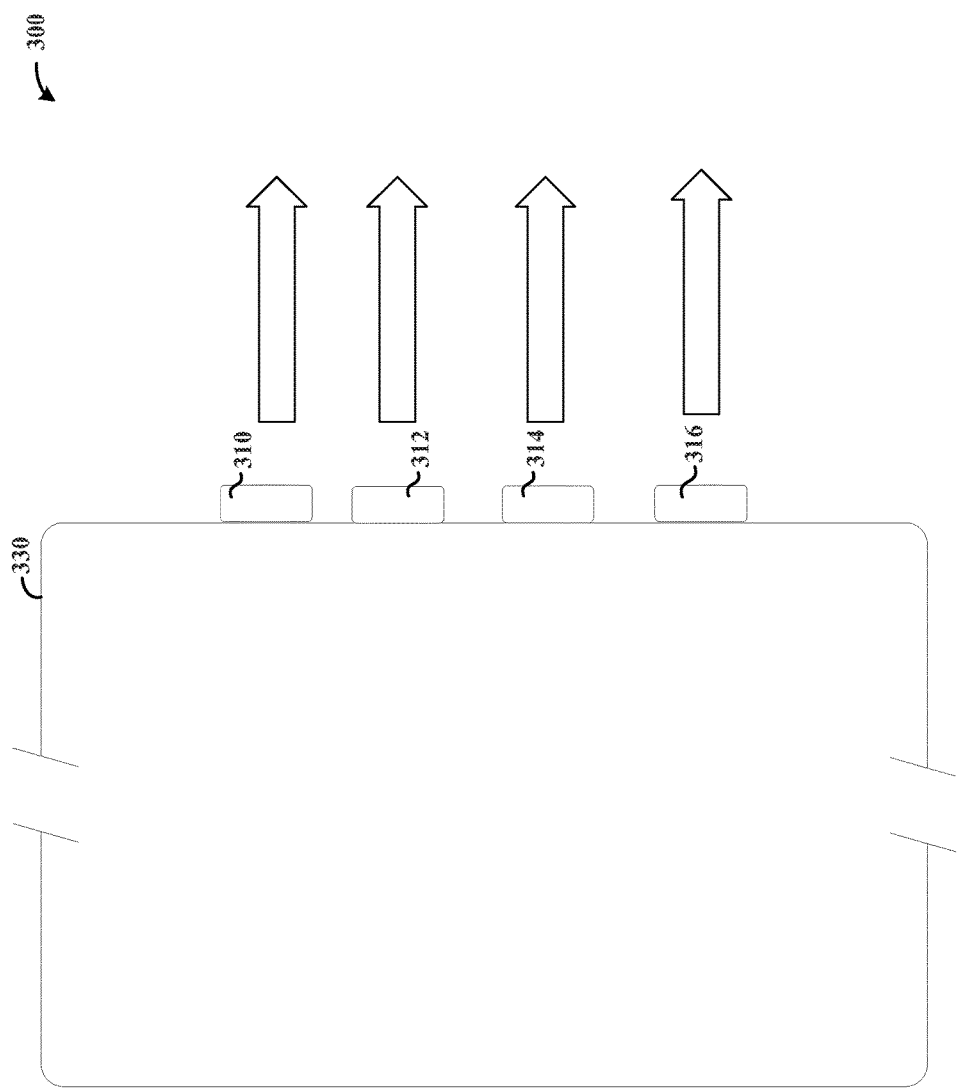
FIG. 3 shows a multi-level temperature sensor apparatus, in accordance with an example embodiment.

FIG. 3 shows a multi-level temperature sensor apparatus 300, in accordance with an example embodiment. The apparatus 300 may, for example, be implemented in a manner similar to that shown in FIG. 1, with sensors 310, 312, 314 and 316 respectively operable to sense different characteristics via different phase-change material. For instance, each sensor as shown may be implemented with a different $T_G$ and $T_C$, which can provide sensitivity to different transition and crystallization temperatures. The sensors may similarly be applied to a monitored environment 330, again shown by way of example, such as may be implemented with packaging.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., readout circuits, sensor circuits, or wireless power circuits such as RFID circuits). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Such aspects may be implemented for reading and/or interpreting characteristics of a phase-change material for inferring temperature operation over time.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, the embodiments shown or described using phase-change material may be implemented with a different type or types of phase-change material that offer a different response to temperature. Moreover, multiple types of phase-change material may be implemented in place of or in addition to those phase-change materials as shown. Such modifications do not depart from the true spirit and scope of various aspects of the invention, including aspects set forth in the claims.

The invention claimed is:

1. An apparatus comprising:
   a phase-change material having a crystalline structure that manifests changes that increases as a function of time over which a perishable item has been exposed to an environment having a temperature that is greater than a threshold temperature; and
   a circuit configured and arranged to respond to the changes by providing a characterization of the exposure of the phase-change material to the environment having the temperature that is greater than the threshold temperature,
   wherein the crystalline structure is configured and arranged to manifest the changes by changing from a first phase to a second phase, and to subsequently undergo a change in crystalline structure in the second phase to crystalline structure in the first phase in response to a voltage applied across the-crystalline structure, therein resetting the phase-change material for detecting exposure of the phase-change material to temperature.

2. The apparatus of claim 1, wherein the phase-change material is operative
   in a first state, exhibiting a crystalline structure that is predominantly in the first phase, corresponding to exposure of the crystalline structure to a first temperature range, and
   in a second state, exhibiting a crystalline structure in which at least a portion of the crystalline structure having the first phase in the first state has undergone a phase-change to the second phase, in accordance with a second temperature range being higher than the first temperature range.

3. The apparatus of claim 2, wherein the crystalline structure exhibits a crystallization rate that increases with temperature, and the phase-change material is operative in the second state, in which the portion of the crystalline structure has undergone the phase-change at different crystallization rates corresponding to increases in temperature over time.

4. The apparatus of claim 1, wherein the circuit is configured and arranged with the phase-change material to characterize an amount of time at which the phase-change material has been exposed to the temperature that is greater than the threshold temperature, by providing an indication of an amount of the crystalline structure that has changed from the first phase to the second phase.

5. The apparatus of claim 1, wherein the circuit is configured and arranged with the phase-change material to:
   characterize a temperature to which the phase-change material has been exposed by providing an indication of an amount of the crystalline structure that has changed from the first phase to the second phase.

6. The apparatus of claim 1, wherein the phase-change material is configured and arranged to transition from the first phase to the second phase at a crystallization rate that increases with increasing temperature.

7. The apparatus of claim 1, wherein the circuit is configured and arranged to harvest electrical power from a wireless signal, and to use the harvested electrical power to transmit a wireless signal characterizing exposure of the phase-change material to the environment having the temperature that is greater than the threshold temperature.

8. The apparatus of claim 1, wherein the phase-change material includes a chalcogenide material in an integrated circuit (IC) including said circuit, the IC further including an RFID circuit configured and arranged to:
   harvest electrical power from a wireless signal, and
   use the harvested electrical power to transmit a wireless signal characterizing exposure of the phase-change material to the environment having the temperature that is greater than the threshold temperature.

9. The apparatus of claim 1, further including a readout circuit having first and second terminals connected by the phase-change material and being configured and arranged to provide an electrical output that is based on an amount of crystalline structure in the phase-change material, relative to an electrical output of the phase-change material in an amorphous state.

10. The apparatus of claim 1, wherein the circuit is configured and arranged to provide the characterization by providing an electrical characteristic of the crystalline structure in the phase-change material.

11. An apparatus comprising:
    a phase-change material having a crystalline structure that manifests changes that increases as a function of time over which a perishable item has been exposed to an environment having a temperature that is greater than a threshold temperature; and
    a circuit configured and arranged to respond to the changes by providing a characterization of the exposure of the phase-change material to the environment having the temperature that is greater than the threshold temperature, wherein
    the phase-change material includes different portions of phase-change material exhibiting different activation energies and crystallization temperatures,
    the circuit includes, for each of the portions of phase-change material, a pair of terminals connected by the portion of phase-change material, and
    the circuit is configured and arranged to provide electrical outputs, for each of the portions of the phase-change material, which is based on an amount of crystalline structure of the portion having manifested changes responsive to temperature, therein characterizing exposure of the phase-change material to respective temperatures above the threshold temperature.

12. The apparatus of claim 11, wherein the different portions of phase-change material exhibit different crystallization temperatures, further including a readout circuit configured and arranged to determine a maximum temperature to which the phase-change material is exposed based upon a first one of the portions having crystallized, and a second one of the portions having not crystallized, with the determined maximum temperature being identified as a temperature in a range between the crystallization temperatures of the first and second portions.

13. The apparatus of claim 11, wherein each of the different portions exhibits a transition temperature ($T_G$) above which an amorphous phase of the portion attains structural configurations and below which the amorphous phase is frozen into a structure that does not readily change structure, and exhibits a crystallization temperature ($T_C$) at which total crystallization of the portion takes place in less than 10 seconds; and wherein each of the different portions exhibits a $T_G$ and $T_C$ that are different than respective $T_G$ and $T_C$ exhibited by the other portions.

14. The apparatus of claim 13, further including a readout circuit configured and arranged to:
determine a maximum temperature exposed to the phase change material as a temperature between $T_C$ of a first one of the portions that exhibits about complete crystallization and $T_C$ of a second one of the portions that exhibits less than complete crystallization; and
determine a duration of exposure of the maximum temperature to the phase change material based on an amount of the second portion having crystallized and a crystallization rate of the second portion.

15. A method comprising:
in a non-powered mode, providing a phase-change material having a crystalline structure that manifests changes that increases as a function of time over which a perishable item has been exposed to an environment having a temperature that is greater than a threshold temperature; and
in a powered mode, responding to the changes by providing a characterization of the exposure of the phase-change material to the environment having the temperature that is greater than the threshold temperature, based on an electrical characteristic of the phase-change material,
in the powered mode, further including:
characterizing an amount of time at which the phase-change material has been exposed to the temperature that is greater than the threshold temperature by providing an indication of an amount of the crystalline structure that has changed from a first phase to a second phase, and
applying a voltage across the crystalline structure, and therein causing the phase-change material to undergo a change in crystalline structure in the second phase to crystalline structure in the first phase.

16. The method of claim 15,
wherein the crystalline structure is configured and arranged to manifest the changes by changing from the first phase to the second phase, and
further including causing the crystalline structure to subsequently undergo a change in crystalline structure in the second phase to crystalline structure in the first phase by applying the voltage across the crystalline structure, therein resetting the phase-change material for detecting exposure of the phase-change material to temperature.

17. The method of claim 15, wherein
the phase-change material includes different portions of phase-change material exhibiting different activation energies and crystallization temperatures, and
providing the characterization of the exposure of the phase-change material to the environment includes providing electrical outputs, for each of the portions of the phase-change material, which is based on an amount of crystalline structure of the portion having manifested changes responsive to temperature, therein characterizing exposure of the phase-change material to respective temperatures above the threshold temperature.

18. The method of claim 15, further including
operating the phase-change material in a first state in which the phase-change material exhibits a crystalline structure that is predominantly in the first phase, by exposing the crystalline structure to a first temperature range, and
exposing the crystalline structure to a second temperature range that is higher than the first temperature range, and therein causing the crystalline structure having the first phase in the first state to undergo a phase-change to the second crystalline phase that is different than the first phase.

* * * * *